United States Patent [19]

Lin

[11] Patent Number: 5,150,255
[45] Date of Patent: Sep. 22, 1992

[54] BINOCULAR WITH SHADING DEVICE

[76] Inventor: Shen-Yuan Lin, No. 3, Alley 61, Chuan Chou Street, San Chung City, Taipei Hsien, Taiwan

[21] Appl. No.: 757,652

[22] Filed: Sep. 5, 1991

[51] Int. Cl.⁵ .............................................. G02B 23/18
[52] U.S. Cl. ...................... 359/409; 359/410; 359/411
[58] Field of Search ................ 359/409, 410, 411

[56] References Cited

U.S. PATENT DOCUMENTS

| | | | |
|---|---|---|---|
| 478,350 | 7/1892 | Nicholson | 359/409 |
| 2,848,924 | 8/1958 | Potez | 359/411 |
| 4,202,601 | 5/1980 | Burbo et al. | 359/409 |
| 4,449,787 | 5/1984 | Burbo et al. | 359/410 X |
| 4,971,429 | 11/1990 | Ishido et al. | 359/409 |

*Primary Examiner*—Eugene R. LaRoche
*Assistant Examiner*—Do Hyun Yoo
*Attorney, Agent, or Firm*—Bacon & Thomas

[57] ABSTRACT

A binocular including two collapsible telescopes mounted to a hat for pivotal movement between a downward extended viewing position and an upward retracted storage position.

8 Claims, 4 Drawing Sheets and

BINOCULAR WITH SHADING DEVICE

BACKGROUND OF THE INVENTION

The present invention relates to a binocular with a shading device, particularly to the type having a pair of telescopes adjustably mounted under a shading device or hat permitting direct observation of distant objects.

The binoculars, monoculars, or telescopes are known in the art, which have an arrangement of lenses or mirrors or both that gather visible light permitting direct observation of distant objects, while the hats cover the head for shading and other purposes.

In the events, such as hiking, mountain climbing, or bird watching, one might need a binocular for a close look and a hat for screening against light or heat. However, neither one can perform or accomplish both objectives at once.

Frequently, one may need to carry the binocular during the event that is inconvenient when, in particular, additional object, such as pop corns or soft drink, is to be taken.

In addition, since the hat and the binocular are separately stored, they may be forgottn. In other words, one might miss good parts of the events mentioned above.

SUMMARY OF THE INVENTION

Therefore, it is an objective of the present invention to provide a binocular with shading device which is aimed to resolve the above-mentioned disadvantages.

It is still an objective of the present invention to provide a binocular with shading device which comprises a shading member and a pair of telescope members rotatably mounted under the shading member, so that the binocular with shading device can be folded in a very compact fashion.

Other objects and advantages will become relevent in view of the disclosure set forth below with reference to the drawings.

DETAILED DESCRIPTION OF THE PREFERRED EMBODIMENT

Figure 1:
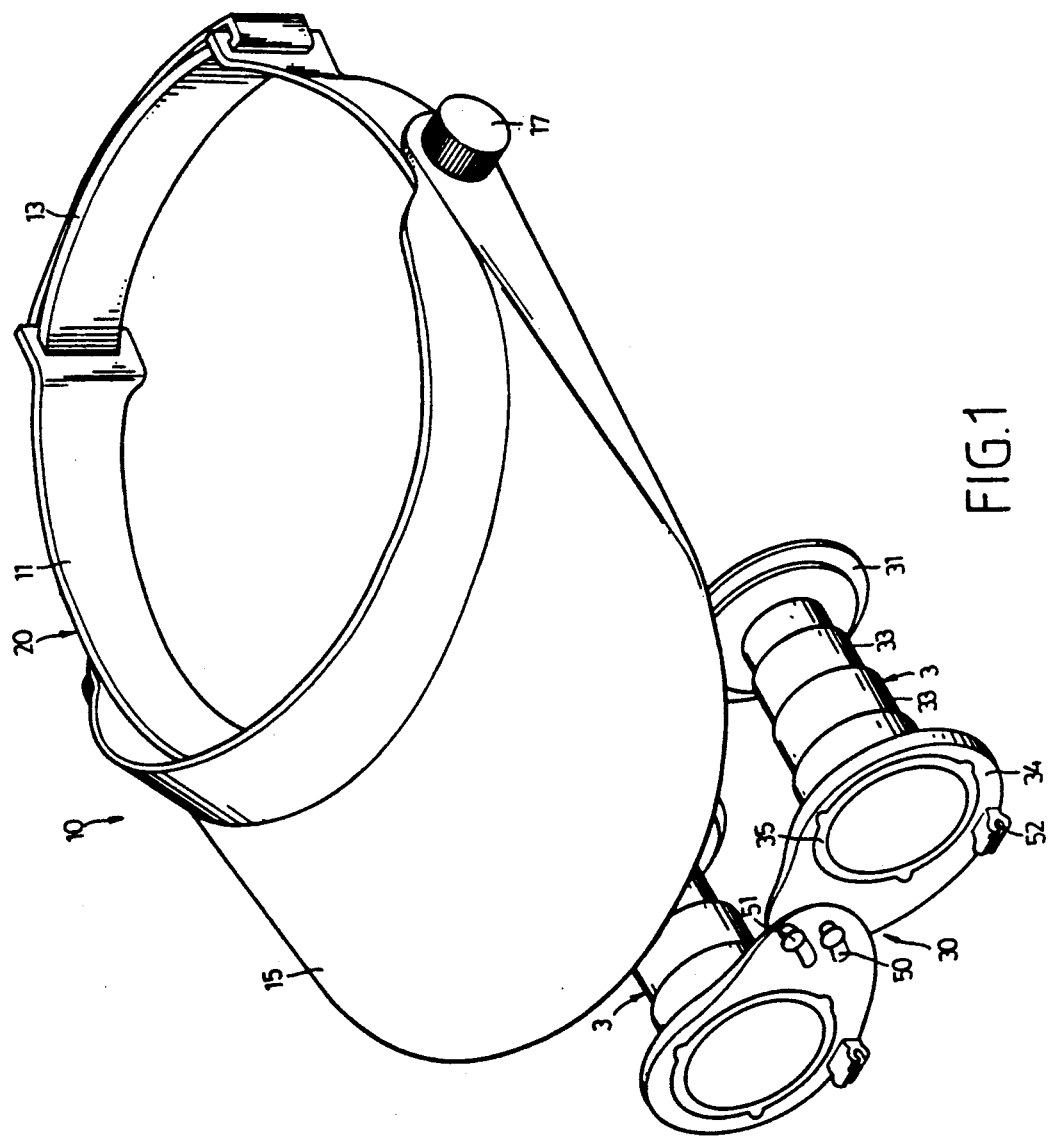
FIG. 1 is a perspective view showing a binocular with shading device according to the present invention.
Figure 2:
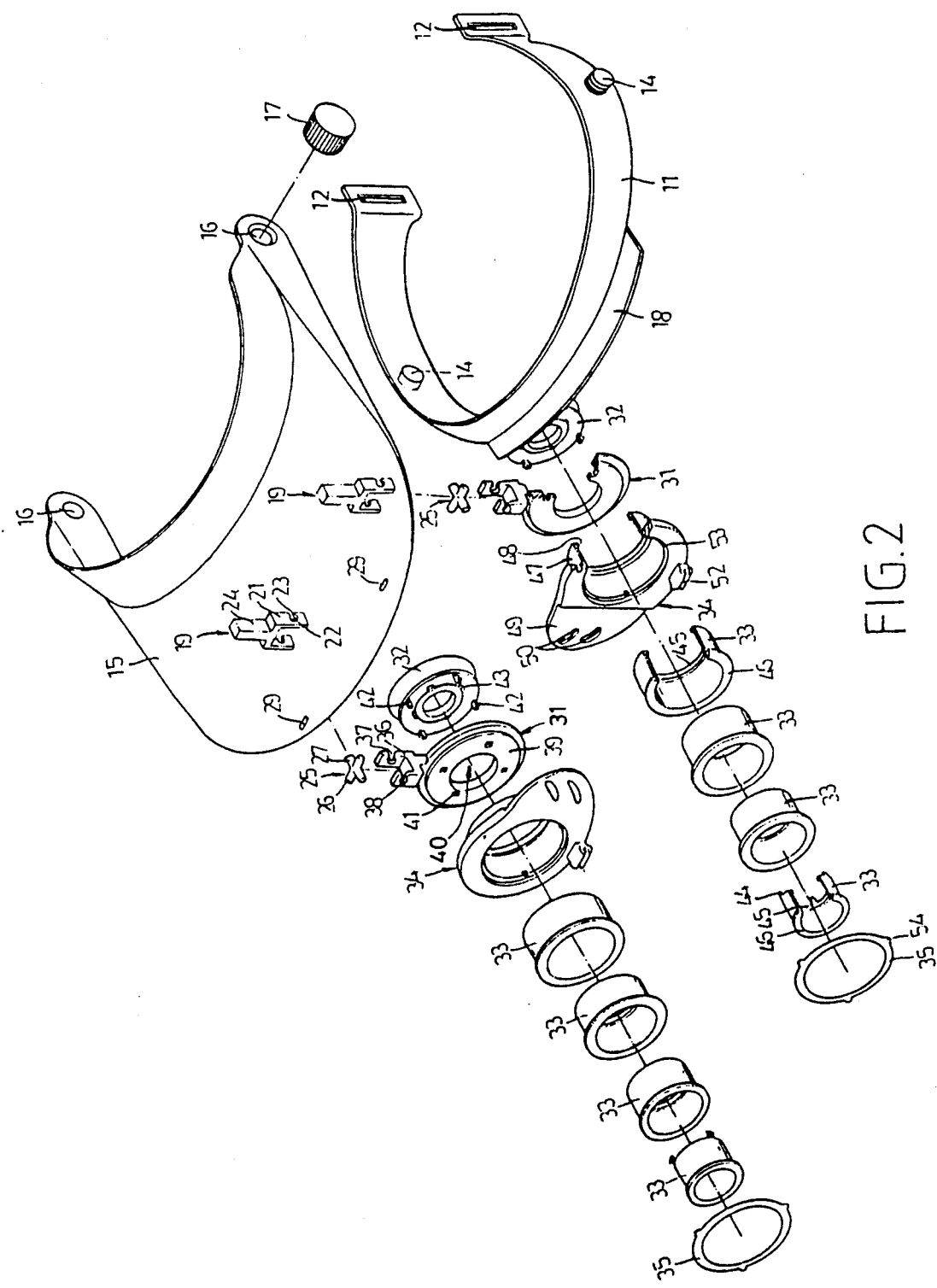
FIG. 2 is another perspective view showing the assembly thereof.

Referring to FIGS. 1 and 2, there is shown a binocular with a device 10, which generally comprises a shading device, or more specifically a hat 20 and a binocular 30 pivotally secured to and under the hat.

The hat 20 is shown particularly in FIG. 2, which comprises a C-shaped rim portion 11 having a pair of rectangular openings 12 formed on the ends thereof to substantially receive a resilient head strip 13, and a pair of threaded protrusions or short shafts 14 defined on opposed sides thereof facing outward.

Detachably mounted with the C-shaped rim portion 11 is a tongue portion 15, which has a pair of openings 16 formed on each side of the rear end thereof in registration with the threaded shafts 14 of the rim portion. As a result, the tongue portion 15 can be turned freely about the threaded shafts 14. However, a pair of screw nuts or buttons with female threads can be engaged with the threaded shafts for security purposes.

Integrally formed on the front of the C-shaped rim portion is an extended skirt portion, which projects outward to substantially support the tongue portion, so as to prevent the tongue portion from falling below the eyesight, or in terms, rotating in the counterclockwise direction below the skirt. Furthermore, as the binocular is mounted on the tongue portion, the extended portion has advantage to support the weight of the binocular.

The tongue portion 15 includes a pair of yokes 19 in front of the eyesight, each having an arm 24 extending downwardly and a pair of bifurcated legs 21 integrally formed below the arm. Defined sidewise on each leg 21 is a hole 23, which has an opening designated by reference numeral 23 inwardly formed to define a C-shaped clamp, in order to receive a cross joint 25 in openings 23.

The connection of the tongue and rim portion is best illustrated in FIG. 2, in which the cross joint 25 has lateral axis 26 and longitudinal axis 27 formed in the yokes 19 and the U-shaped connection 36 formed on the binocular, respectively. By way of example, the lateral axis 26 has axial ends to be received in the holes 23, while the longtudinal axis 27 has axial ends to be received by the holes 38 via openings 37 defined on the U-shaped connection.

Further referring to FIGS. 1 and 2, the binocular 30 is generally formed of a pair of collapsible telescope-like members 3, each of which includes a first lens frame 31, first lens 32, a plurality of cylindrical sections 33, a second frame 34 and a ring member 35. The first lens 32 is close to the eye, and similarly, the second frame 34 is away from the eye as in the conventional manner.

Attention is drawn to the U-shaped connection 36, which is integrally formed on the first lens frame 31, having a pair of holes 38 formed on the upward extended arms thereof and a pair of openings 37 facing to and receiving the longitudinal axis 27, such that the collapsible telescope-like member 3 is able to turn with respect to two axes of the cross joint.

The first lens frame 31 has an annular body 39 having a central bore 40 disposed below the U-shaped connection. A plurality of protrusions 42 are radially, spacedly apart formed below inner and outer diameters of the annular body 39, to which a plurality of recesses in registration therewith defined on the first lens 32 are detachably inserted for security purposes. In addition, there is formed a plurality of recesses 43 defined radially spaced apart on the first lens to respectively receive a plurality of protrusions 44 on the corresponding smallest cylindrical section 33.

It is noted that, in the drawings, the numbers of protrusions and respective recesses are four, while it is not intended to be limited but illustrated. It is further noted that the recesses 43 and protrusions 42 formed on the first lens are alternatively spaced, for example, 45 degree shifted to facilitate the connecting with the first frame and the cylindrical section, respectively.

The cylindrical sections 33, which according to one embodiment of the present invention has number of four, is intended to illustrate the invention, and shall not be interpreted as the limitation thereof.

Figure 3:
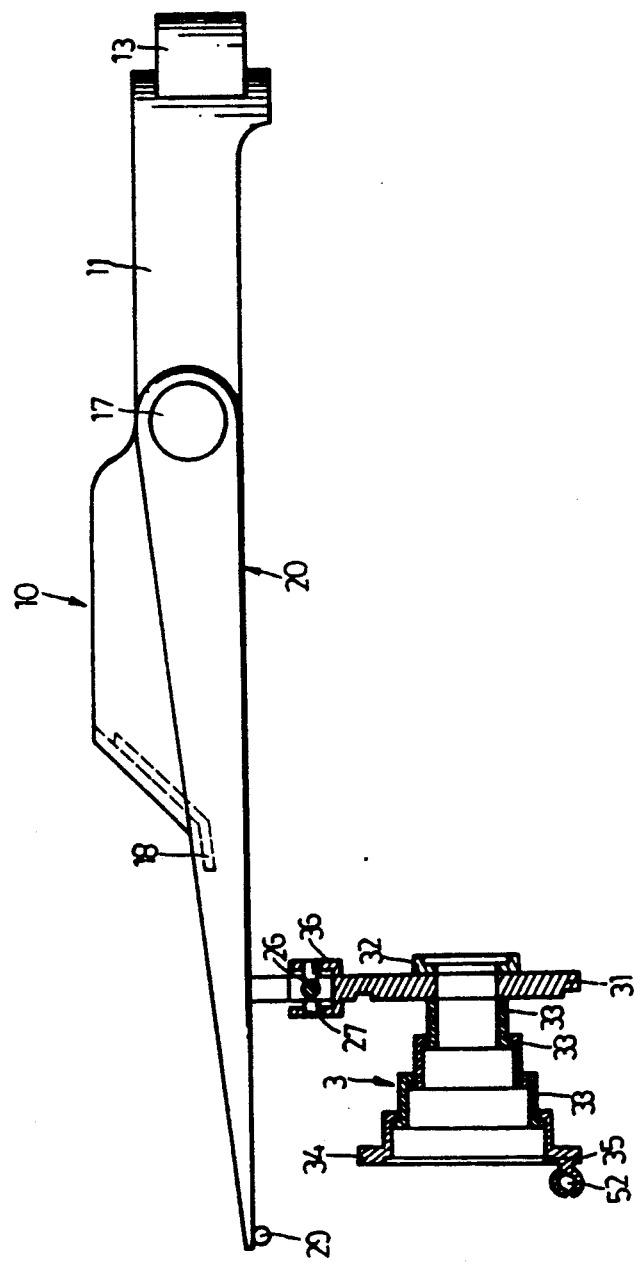
FIG. 3 is a partial, side cross-sectional view showing the structure of binocular according to one embodiment thereof.
Figure 4:
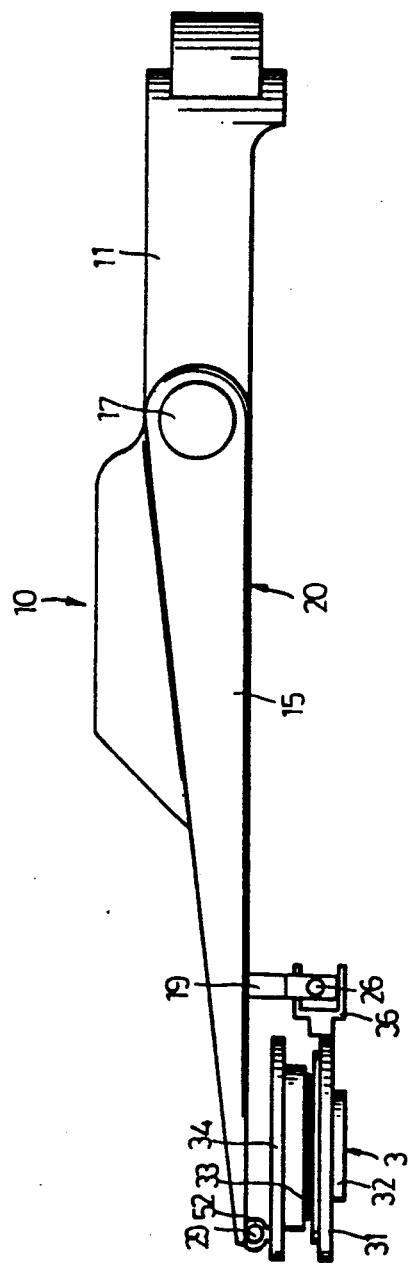
FIG. 4 is a side view showing the present invention in a folded position.

Turning now to FIGS. 1 and 3, the cylindrical sections have one section adjacent to the first lens frame which has smallest diameter, and have subsequently increased diameters for the rest thereof. As a result, the sections can be telescopedly connected. This is further explained hereinbelow.

The cylindrical section 33, each has a inner flange 45 formed at one end which is substantially equal to the other end of the adjacent section, so that the adjacent cylindrical section is allowed to slidably move forward or backward.

In addition, the front end is formed of an outer flange 46 opposed to the inner flange end, so that when the cylindrical sections extend to form a telescope, the outer flange 46 is seated on and stopped by the inner flange 45 as depicted in FIG. 3. This feature prevents the sections disconnecting from each other.

Telescopedly connected with the largest cylindrical section is the second lense frame 34, which has a cylindrical hollow body 47 providing an inner flange 48 at one end. Similarly, the inner flange 48 is slidably interconnected with the outer flange of the cylindrical section as that of the flange 45 and 46. However, opposed to the inner flange 48, there is formed a wing member 49 integrally on the cylindrical hollow body at the other end.

Each of the wing member 49 has a pair of openings to receive a pair of buttons formed on the other wing member in registration with the opening thereof. The openings have contour being suitable for the movement in a way that rotation of the telescope-like members about axal 27 can be performed, through which the U-shaped connection portion 36 are respectively connected.

The second lens frame 34 and cylindrical sections 33 are made from resilient materials, such as synthetic resin, so that they can be easily interconnected in an overlapping position, or simply, telescopedly connected.

Further, the second lens frame 34 includes a C-shaped clamp 52 disposed on the lower front side thereof to detachably connect with a rib member 29 placed under the tongue portion 15. As a result, when the telescopes 3 are in folding position and rotated about 90 degree clockwise with respect to the axal 26, the C-shaped member 52 can be secured to the rib member. Therefore, the telescopes can be formed in a very compact fashion.

Mounted with the second lens frame 34 is a ring member 35 to secure a lens disposed in the second lens frame. This can be accomplished by inserting protrusions 54 formed on member 35 in registration with into recesses 53 defined on the second lens frame 34.

The theory and objects of a telescope are known in the art. Therefore, no further discussion shall be given for clarity. However, the disclosure set forth is intended for illustrative purposes and any modification of the invention shall be interpreted under the scope of the claims.

What is claimed is:

1. A binocular provided with a shading device comprising:
   a) a hat for screening against light and heat, the hat including a front portion and a pair of yokes extending downwardly from the front portion and positioned forwardly of the eyes of a wearer of the hat;
   b) a pair of collapsible telescopes, each telescope including a front end and a rear end, each rear end being provided with a U-shaped member;
   c) a cross joint connecting each yoke with a U-shaped member for permitting the telescope to pivot between a downward viewing position when extended and an upward storage position when retracted; and
   d) cooperating means carried by the telescopes and the hat for securing the telescopes in the upward storage position.

2. The binocular of claim 1 wherein:
   a) each yoke includes an arm and a pair of legs provided with a pair of aligned holes formed therethrough;
   b) each U-shaped member includes a pair of aligned C-shaped openings formed therethrough; and
   c) each cross joint including a lateral axis engaged within the aligned holes of the yoke and a longitudinal axis engaged within the C-shaped openings of the U-shaped member.

3. The binocular of claim 1 wherein the cooperating means includes a pair of ribs carried by the front portion of the hat and a C-shaped clamp carried at the front end of each telescope.

4. The binocular of claim 1 wherein:
   a) the hat further includes a rear portion provided with a pair of spaced holes formed therethrough;
   b) a C-shaped rim member including a pair of ends, a rectangular opening formed in each end, a pair of threaded protrusions extending outwardly from opposed sidewall portions thereof, and a skirt extending forwardly from a front portion thereof;
   c) the threaded protrusions being engaged through the pspaced holes at the rear portion of the hat, and a threaded nut engaged on each protrusion for securing the hat to the rim member; and
   d) a resilient strip inserted through the rectangular openings of the rim member for securing the hat on a head of a wearer.

5. The binocular of claim 1 wherein:
   a) each telescope includes a first lens frame and a first lens mounted to the first lens frame at the rear end of the telescope;
   b) a plurality of cylindrical sections of decreasing diameter slidably connected together between the front and rear ends; and
   c) a second lens frame and a second lens mounted to the second lens frame at the front end.

6. The binocular of claim 5 wherein each second lens frame includes:
   a) a pair of curved openings, a pair of buttons interconnect the pairs of curved openings of both second lens frames to permit rotation of the telescopes relative to each other for viewing adjustment.

7. The binocular of claim 6 wherein:
   a) each first lens frame further includes a plurality of spaced recesses;
   b) each smallest diameter cylindrical section includes a plurality of first protrusions and;
   c) each first lens includes a plurality of recesses in registration with and engageable by the first protrusions of each smallest diameter cylindrical section, and a plurality of second protrusions in registration with and engageable within the recesses of each first lens frame.

8. The binocular of claim 7 wherein each second lens frame further includes a ring member for mounting a lens thereto.

* * * * *